(12) United States Patent
Barman et al.

(10) Patent No.: US 10,618,484 B1
(45) Date of Patent: Apr. 14, 2020

(54) BODY STRUCTURE ENERGY EFFICIENT DEFLECTOR FOR SMALL OVERLAP IMPACT

(71) Applicant: GM Global Technology Operations LLC, Detroit, MI (US)

(72) Inventors: Amlanjyoti Barman, Troy, MI (US); Andre T. Matsumoto, Sterling Heights, MI (US); Zohir Molhem, Rochester Hills, MI (US); Andrew W. White, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/158,781

(22) Filed: Oct. 12, 2018

(51) Int. Cl.
*B60R 19/16* (2006.01)
*B60R 19/34* (2006.01)
*B62D 21/15* (2006.01)
*B60R 21/00* (2006.01)

(52) U.S. Cl.
CPC .............. *B60R 19/16* (2013.01); *B60R 19/34* (2013.01); *B62D 21/152* (2013.01); *B60R 2021/0023* (2013.01)

(58) Field of Classification Search
CPC ........ B60R 19/16; B60R 19/34; B62D 21/152
USPC ............................. 296/187.03, 187.09, 187.1
See application file for complete search history.

(56) References Cited

U.S. PATENT DOCUMENTS

| | | | |
|---|---|---|---|
| 9,446,797 B2 * | 9/2016 | Nakauchi | B62D 25/081 |
| 2007/0215402 A1 * | 9/2007 | Sasaki | B62D 21/152 180/232 |
| 2013/0249245 A1 * | 9/2013 | Sekiguchi | B62D 25/082 296/187.09 |

* cited by examiner

*Primary Examiner* — Joseph D. Pape (57) ABSTRACT

A vehicle body structure deflector system for small overlap frontal impact includes a first shock tower and a second shock tower. A cross member is positioned between each of the first shock tower and the second shock tower. A first deflector is connected to the first shock tower and a second deflector is connected to the second shock tower. If one of the first deflector or the second deflector is contacted by a barrier during forward travel of the vehicle a portion of an energy of impact with the barrier is transferred through one of the first shock tower or the second shock tower, through the cross member and into the other shock tower. The portion of the energy of impact with the barrier generates a vehicle lateral displacement to dissipate the portion of the energy of impact.

17 Claims, 7 Drawing Sheets

BODY STRUCTURE ENERGY EFFICIENT DEFLECTOR FOR SMALL OVERLAP IMPACT

INTRODUCTION

The present disclosure relates to automobile vehicle structural designs adapted for small overlap front impact loading.

Automobile vehicles are impact tested for example applying a small overlap impact test to determine structural integrity of the vehicle and identify values of impact loading which are transferred to the vehicle occupant compartment. Conventional vehicle structures are designed to absorb impact energy by collapse and yielding of the structures, however, this may impart significant impact loading to the occupant compartment.

Thus, while current vehicle body structures achieve their intended purpose, there is a need for a new and improved system and method for managing vehicle impact loading by the vehicle structure.

SUMMARY

According to several aspects, a vehicle body structure deflector system includes a first shock tower and a second shock tower of a vehicle. A cross member is positioned between the first shock tower and the second shock tower. A first deflector is connected to the first shock tower. The first deflector is angularly oriented to be contacted by a barrier during forward travel of the vehicle and to transfer a portion of an energy of impact with the barrier through the first shock tower, through the cross member and into the second shock tower.

In another aspect of the present disclosure, the portion of the energy of impact with the barrier generates a vehicle lateral displacement.

In another aspect of the present disclosure, a vehicle displacement direction is substantially parallel with a longitudinal axis of the cross member.

In another aspect of the present disclosure, the first deflector includes a contact face contacted by the barrier oriented substantially perpendicular to a longitudinal axis of the first deflector.

In another aspect of the present disclosure, the first deflector includes a contact face contacted by the barrier oriented at an angle gamma with respect to a longitudinal axis of the first deflector, with the angle gamma ranging from approximately 70 degrees to approximately 120 degrees with respect to the longitudinal axis.

In another aspect of the present disclosure, the first deflector includes a longitudinal axis, with the longitudinal axis oriented at an angle with respect to a plane extending through a center of the first shock tower which is oriented parallel with a forward direction of travel of the vehicle.

In another aspect of the present disclosure, the first deflector includes a first flange used to mount and fix the first deflector at a first end to an outer wall of the first shock tower.

In another aspect of the present disclosure, the first deflector further includes: a second flange used to mount and fix the first deflector to a first structural member; a third flange defining a joining wall which transitions the first deflector between the first structural member and a second structural member; and a fourth flange used to mount and fix the first deflector to the second structural member.

In another aspect of the present disclosure, a centerline of the cross member is coaxially aligned with a common central axis extending through the first shock tower and the second shock tower.

In another aspect of the present disclosure, a longitudinal axis of the cross member is displaced from a common central axis extending through a center of the first shock tower and a center of the second shock tower. A first coupling member connected between the first shock tower and the cross member to carry an impact load received at the first deflector through the first shock tower and through the first coupling member into the cross member.

According to several aspects, a vehicle body structure deflector system includes a first shock tower and a second shock tower of a vehicle. A cross member is positioned between each of the first shock tower and the second shock tower. A first deflector is connected to the first shock tower and a second deflector is connected to the second shock tower. If one of the first deflector or the second deflector is contacted by a barrier during forward travel of the vehicle a portion of an energy of impact with the barrier is transferred through one of the first shock tower or the second shock tower, through the cross member and into the other one of the first shock tower or the second shock tower. The portion of the energy of impact with the barrier generates a vehicle lateral displacement to dissipate the portion of the energy of impact.

In another aspect of the present disclosure, the cross member is directly connected to each of the first shock tower and the second shock tower, having a longitudinal axis of the cross member coaxially aligned with a center of each of the first shock tower and the second shock tower.

In another aspect of the present disclosure, the first deflector and the second deflector are angularly oriented, and the first deflector and the second deflector each includes a longitudinal axis, with the longitudinal axis oriented at an angle with respect to a plane extending through a center of one of the first shock tower or the second shock tower which is oriented parallel with a forward direction of travel of the vehicle.

In another aspect of the present disclosure, a first coupling member is connected between the first shock tower and the cross member to carry an impact load received at the first deflector through the first shock tower and through the first coupling member into the cross member. A second coupling member is connected between the second shock tower and the cross member to carry an impact load received at the second deflector through the second shock tower and through the second coupling member into the cross member.

In another aspect of the present disclosure, the first deflector and the second deflector each includes a raised central region which extends for substantially an entire length of the first deflector and the second deflector and provides longitudinal and lateral stiffening to transfer impact loads through the first deflector and the second deflector.

In another aspect of the present disclosure, the first deflector and the second deflector are each connected to a planar first structural member and a planar second structural member, and each includes a flange defining a joining wall which transitions in elevation between the first structural member and a second structural member.

According to several aspects, a vehicle body structure deflector system includes a first shock tower and a second shock tower of a vehicle. A cross member is positioned between each of the first shock tower and the second shock tower. A first deflector is connected to the first shock tower and a second deflector is connected to the second shock tower. If one of the first deflector or the second deflector is contacted by a barrier during forward travel of the vehicle a portion of an energy of impact with the barrier is transferred through one of the first shock tower or the second shock tower, through the cross member and into the other one of the first shock tower or the second shock tower. The portion of the energy of impact with the barrier generates a vehicle lateral displacement equal to at least 19% of a width of the vehicle to dissipate the portion of the energy of impact.

In another aspect of the present disclosure, a longitudinal axis of the cross member is displaced from a common central axis extending through a center of the first shock tower and a center of the second shock tower. A first coupling member is connected between the first shock tower and the cross member to carry an impact load received at the first deflector through the first shock tower and through the first coupling member into the cross member, the first coupling member in coaxial alignment with the first deflector.

In another aspect of the present disclosure, a longitudinal axis of the cross member is displaced from a common central axis extending through a center of the first shock tower and a center of the second shock tower. A first coupling member is connected between the first shock tower and the cross member to carry an impact load received at the first deflector through the first shock tower and through the first coupling member into the cross member. The first coupling member is not in coaxial alignment with the first deflector.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
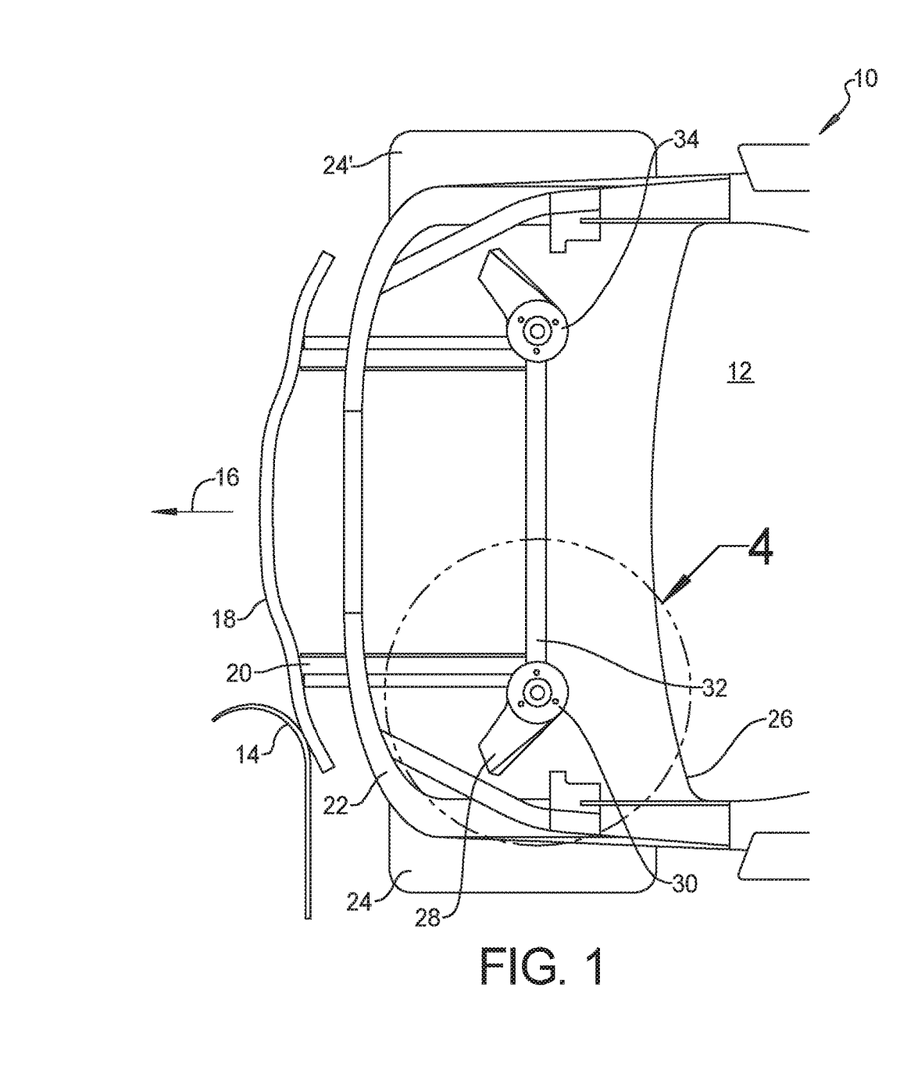
FIG. 1 is a top plan view of a forward section of a vehicle having a body structure deflector system according to an exemplary embodiment.

Referring to FIG. 1, a vehicle body structure deflector system 10 is provided for an automobile vehicle 12. The vehicle 12 is designed for small overlap impact with an object such as a rigid barrier 14 when traveling at a speed of approximately 64 kilometers per hour in a forward direction 16. The barrier 14 initially contacts a bumper structure 18 outboard of a structural member 20 connected to the bumper structure 18, allowing the bumper structure 18 and the structural member 20 to yield and deflect, further allowing the rigid barrier 14 to contact and deflect a front compartment structure 22 which provides support for a left wheel 24 and a right wheel 24'. It is desirable to minimize impact loading to a passenger compartment 26 of the vehicle 12 during the impact event with the barrier 14.

Figures 4, 5:
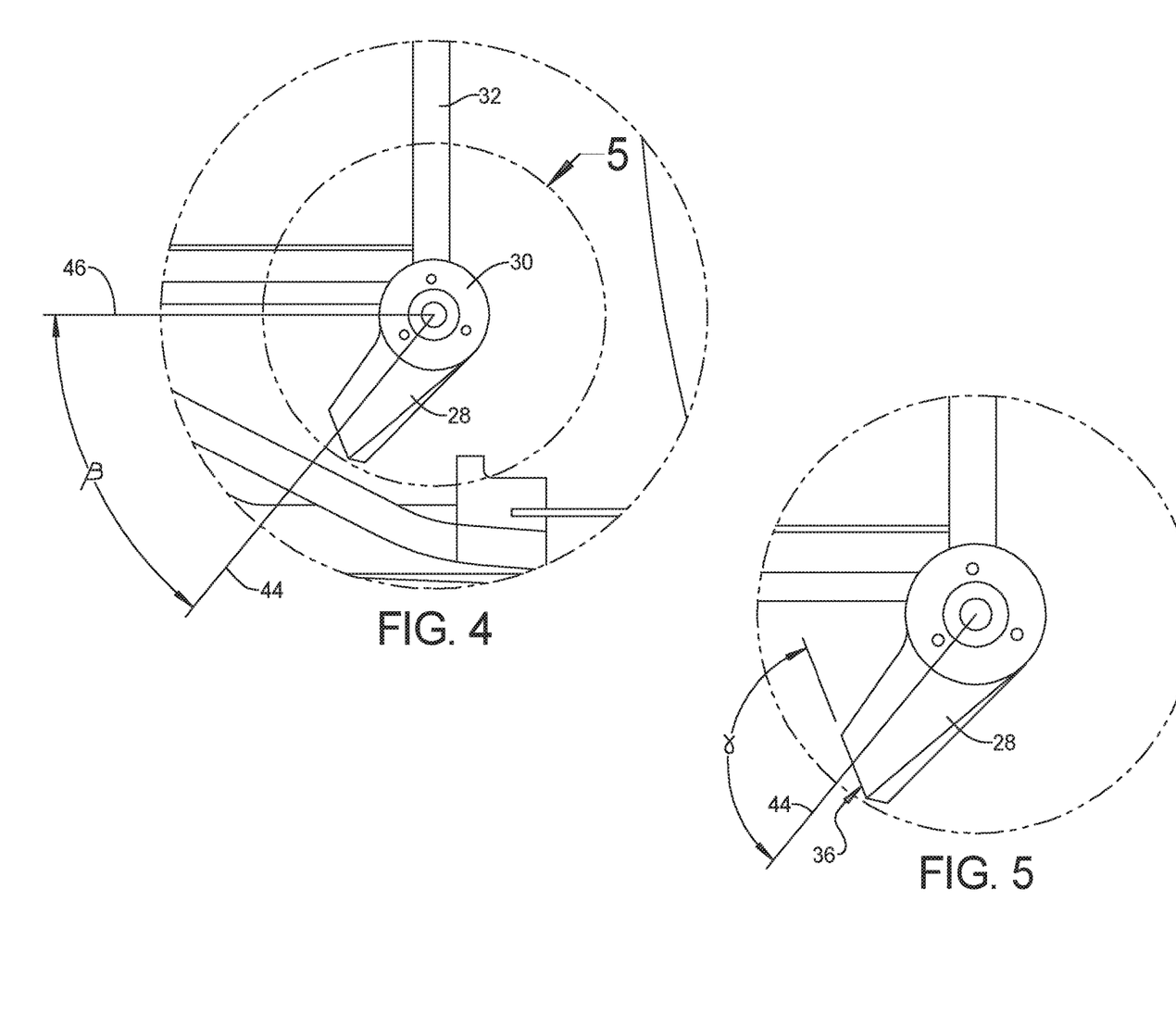
FIG. 4 is a top plan view of area 4 of FIG. 1.
FIG. 5 is a top plan view of area 5 of FIG. 4.

In lieu of designing the front compartment structure 22 to collapse and absorb the entire impact energy of the barrier 14 or allow impact energy to dissipate into the passenger compartment 26, the body structure deflector system 10 incorporates a first deflector 28 connected to a first shock tower 30. The first shock tower 30 is rigidly connected via a cross member 32 to a second shock tower 34 adjacent the right wheel 24'. The first deflector 28 is angularly oriented to be contacted by the barrier 14 and to transfer a portion of the energy of impact with the barrier 14 through the structure of the shock tower 30, through the cross member 32 and into the second shock tower 34. It is noted that a second deflector (not shown in this view but shown and described in reference to FIGS. 5 and 6) is also provided with the second shock tower 34, which is oppositely configured from the first deflector 28, but is similarly designed and connected, therefore the following discussion of the first deflector 28 applies equally to the second deflector.

Referring to FIG. 2 and again to FIG. 1, the initial point of impact between an end face 36 of the first deflector 28 with the barrier 14 is depicted with the vehicle 12 moving in the forward direction 16. The front compartment structure 22 is yielding and the left wheel 24 is both displacing and collapsing in a rearward direction 38 from impact with the barrier 14, however, at this time there is substantially no lateral displacement occurring of the vehicle 12 in a direction 40 caused by impact with the barrier 14.

Figure 2:
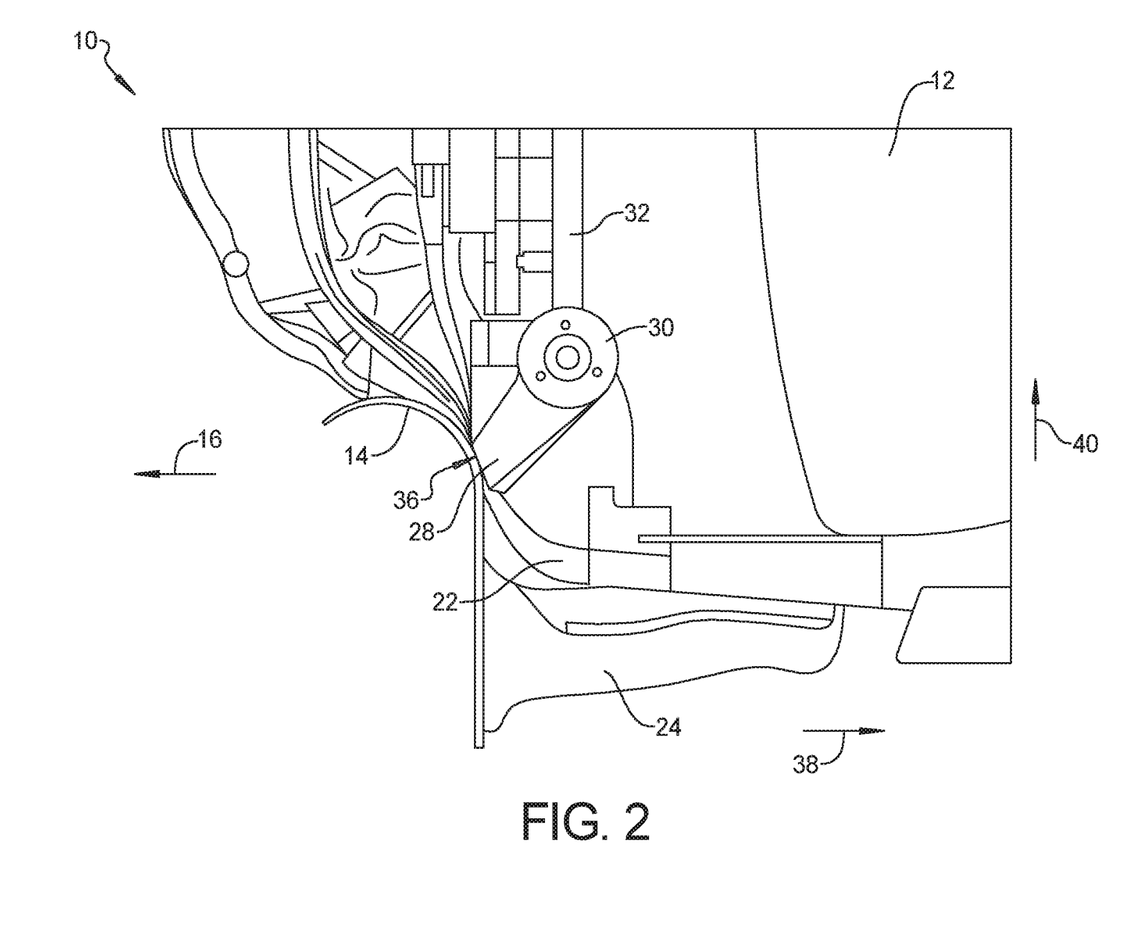
FIG. 2 is a top plan view similar to FIG. 1 during contact with a barrier.

Referring to FIG. 3 and again to FIGS. 1 and 2, after impact with the barrier 14, the front compartment structure 22 has substantially collapsed and the left wheel 24 is substantially collapsed and has displaced in the rearward direction 38. As the vehicle 12 continues to move in the forward direction 16, and after the barrier 14 contacts the end face 36 of the first deflector 28, as noted above a portion of the impact energy is transferred by the first deflector 28 through the structure of the shock tower 30, through the cross member 32 and into the second shock tower 34. This energy transfer causes a lateral displacement of the vehicle 12 in the direction 40 which is approximately perpendicular to the forward direction 16. By dissipating the energy of contact with the barrier 14 by vehicle displacement, transference of the impact energy into the passenger compartment 26 is reduced.

Figure 3:
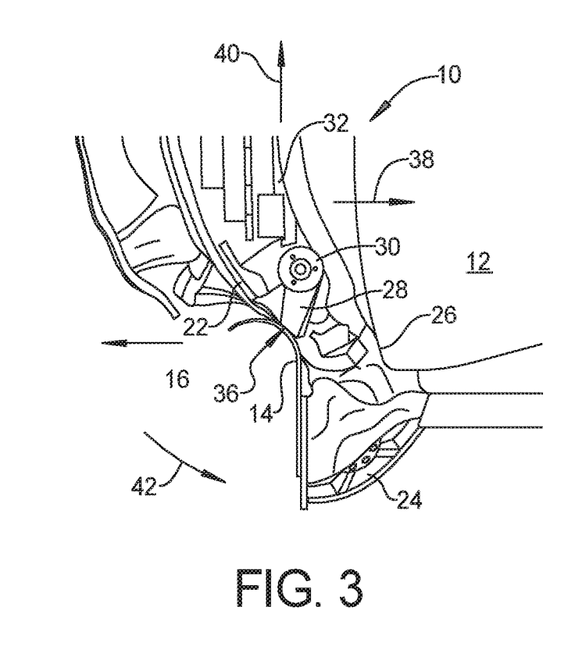
FIG. 3 is a top plan view similar to FIG. 2 showing further displacement of the vehicle after contact with the barrier.

During the impact event between the barrier 14 and the first deflector 28, the first deflector 28, and thereby the first shock tower 30 can yield and rotate in a counterclockwise direction 42 until the first deflector 28 is oriented approximately parallel with the original orientation of the cross member 32 as shown. The first shock tower 30 and its connection with the cross member 32 can also deflect in the rearward direction 38 to further absorb a portion of the impact energy of the barrier 14 and as the vehicle 12 displaces in the direction 40.

Referring to FIG. 4 and again to FIGS. 1 through 3, in an installed, pre-impact configuration the first deflector 28 is fixed, for example by welding, fastening, adhesive bonding or similar process or combination of processes to the first shock tower 30. The cross member 32 is also fixed to the first shock tower 30, for example by fastening or welding. The first deflector 28 is angularly oriented such that a longitudinal axis 44 of the first deflector 28 is oriented at an angle beta ($\beta$) with respect to a plane 46 extending through a center of the first shock tower 30 which is oriented parallel with the forward direction 16. According to several aspects angle $\beta$ is approximately 45 degrees, however angle $\beta$ can range from approximately 20 degrees up to approximately 80 degrees to suit the available geometry of the vehicle 12.

Referring to FIG. 5 and again to FIGS. 1 through 4, in a nominal condition the end face 36 of the first deflector 28 is oriented substantially perpendicular with respect to the longitudinal axis 44. According to further aspects the end face 36 is initially oriented at an angle gamma ($\gamma$) with respect to the longitudinal axis 44, with the angle $\gamma$ ranging from approximately 70 degrees to approximately 120 degrees with respect to the longitudinal axis 44. The angle $\gamma$ can be varied depending on the orientation of the longitudinal axis 44 and a configuration of the other components and structure in the forward compartment of the vehicle 12.

Referring to FIG. 6 and again to FIGS. 1 through 5, according to several aspects, a body structure deflector system 48 is modified from the body structure deflector system 10 for a vehicle 50 and provides a first shock tower 54 in structural communication with a second shock tower 56. The first shock tower 54 and the second shock tower 56 are positioned on a common central axis 58 extending through a first center 60 of the first shock tower 54 and through a second center 62 of the second shock tower 56. The common central axis 58 is spatially displaced from a longitudinal axis 64 of a cross member 66 joining the first shock tower 54 to the second shock tower 56 by a displacement dimension 63, therefore the first shock tower 54 and the second shock tower 56 are not both directly connected to the cross member 66.

Figure 6:
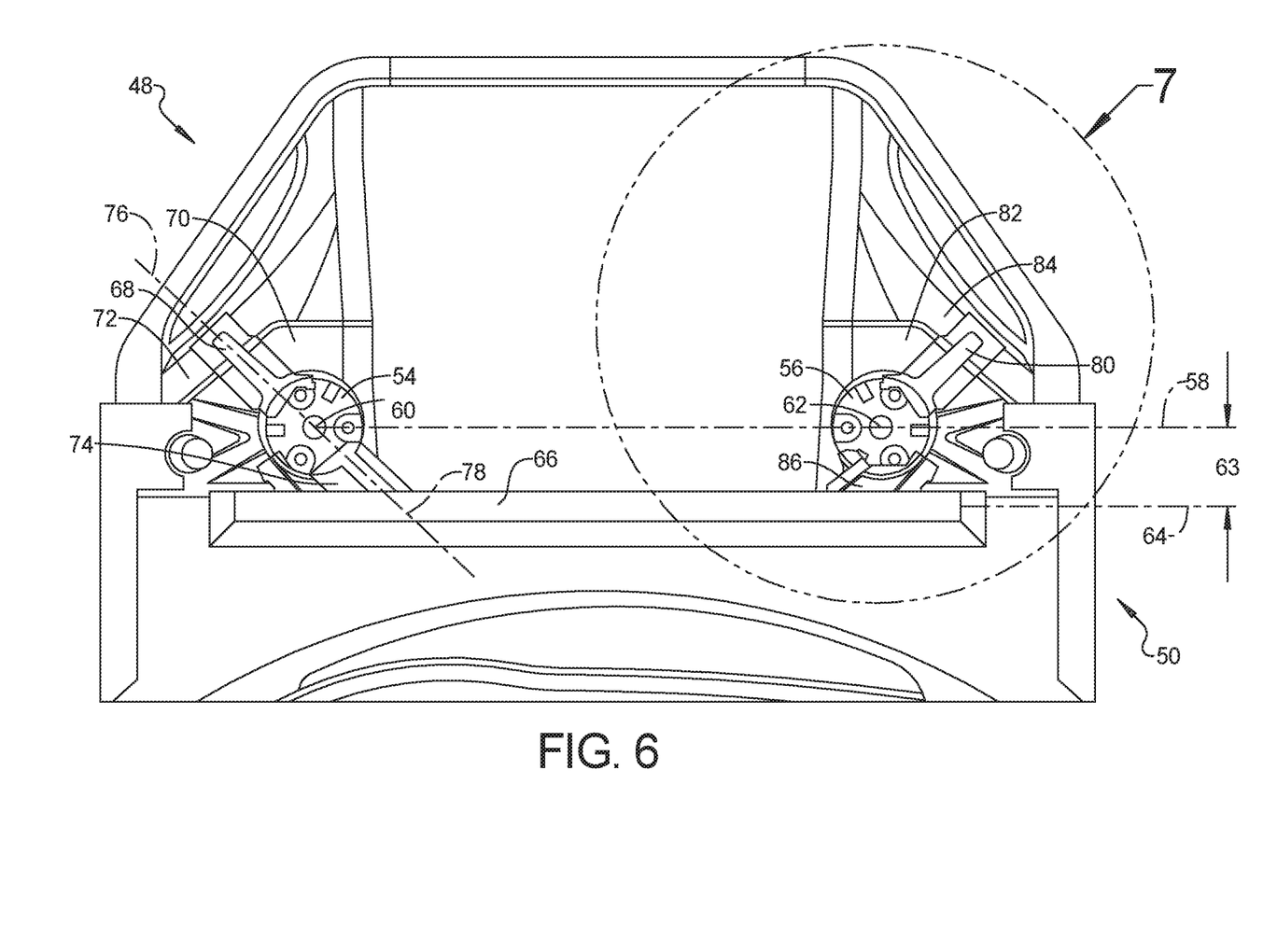
FIG. 6 is a top plan view of a forward section of a vehicle having a body structure deflector system according to another aspect.

The body structure deflector system 48 provides a first deflector 68 which is fixed to each of a first structural member 70 and a second structural member 72 on a left front wheel side of the vehicle 50. According to several aspects, the first structural member 70 is elevated above the second structural member 72, therefore the first deflector 68 is configured using different elevated flanges discussed below in reference to FIG. 7 to contact each of the first structural member 70 and the second structural member 72. Because the longitudinal axis 64 of the cross member 66 is not coaxially aligned with the common axis 58 a first coupling member 74 is connected between the first shock tower 54 and the cross member 66 to carry an impact load received at the first deflector 68 through the first shock tower 54 into the cross member 66. According to several aspects, a longitudinal axis 76 of the first deflector 68 is coaxially aligned with a longitudinal axis 78 of the first coupling member 74.

According to several aspects, a second deflector 80 is similarly connected to each of a third structural member 82 and a fourth structural member 84 and to the second shock tower 56 on a right front wheel side of the vehicle 50. A second coupling member 86 fixed to each of the second shock tower 56 and to the cross member 66 is coaxially aligned with the second deflector 80 and therefore functions similar to the first coupling member 74 to carry impact loads from the second deflector 80 through the second shock tower 56 into the cross member 66.

Referring to FIG. 7 and again to FIG. 6, the following discussion of the second deflector 80 and the second coupling member 86 applies equally to the first deflector 68 and the first coupling member 74. The second deflector 80 includes a first flange 88 used to mount and fix (for example by welding, fastening, adhesive bonding or a combination of these) the second deflector 80 at a first end to an outer wall 90 of the second shock tower 56. A second flange 92 is used to mount and fix the second deflector 80 to the third structural member 82 which can be planar as shown. A third flange 94 defines a joining wall which transitions the second deflector 80 in elevation between the higher elevated third structural member 82 and the lower elevated fourth structural member 84. A fourth flange 96 is used to mount and fix the second deflector 80 to the fourth structural member 84 which can also be planar as shown. A fifth flange 98 functioning similarly to the end face 36 of the first deflector 28 is used to mount and fix the second deflector 80 at a second or distal end to an outer wall 100 of the fourth structural member 84. The fifth flange 98 performs the same function as the end face 36 of the first deflector 28 described in reference to FIG. 2 when contacted by the barrier 14. The second deflector 80 further includes a raised central region 102 which extends for substantially an entire length of the second deflector 80 between the fifth flange 98 and the first flange 88 and provides longitudinal and lateral stiffening to transfer impact loads through the second deflector 80.

Figure 7:
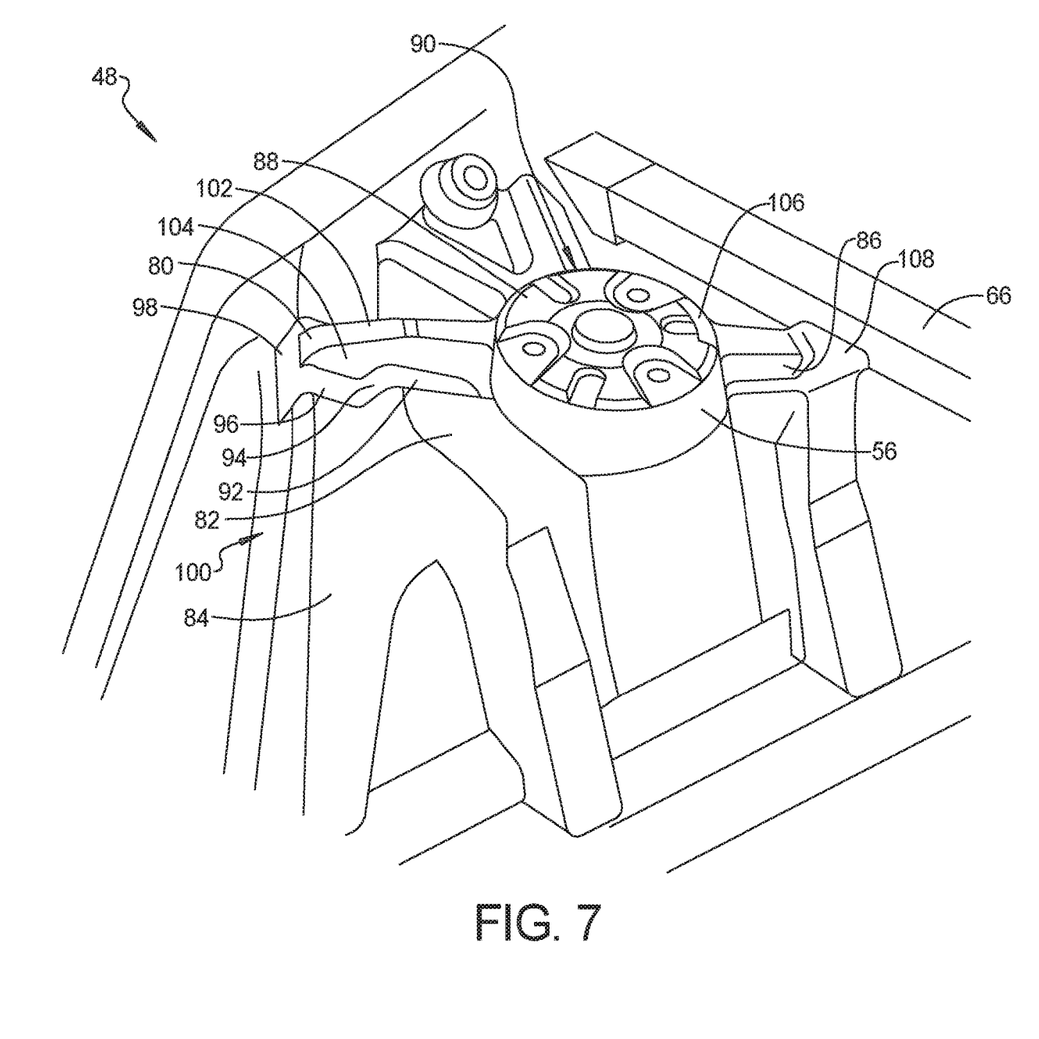
FIG. 7 is a top left perspective view of area 7 of FIG. 6.

The second coupling member 86 includes a first end flange 106 used to mount and fix (for example by welding, fastening, adhesive bonding or a combination of these) the second coupling member 86 at a first end to the outer wall 90 of the second shock tower 56. The second coupling member 86 further includes a second end flange 108 used to mount and fix the second coupling member 86 at a second end to the outer wall of the cross member 66.

Figure 8:
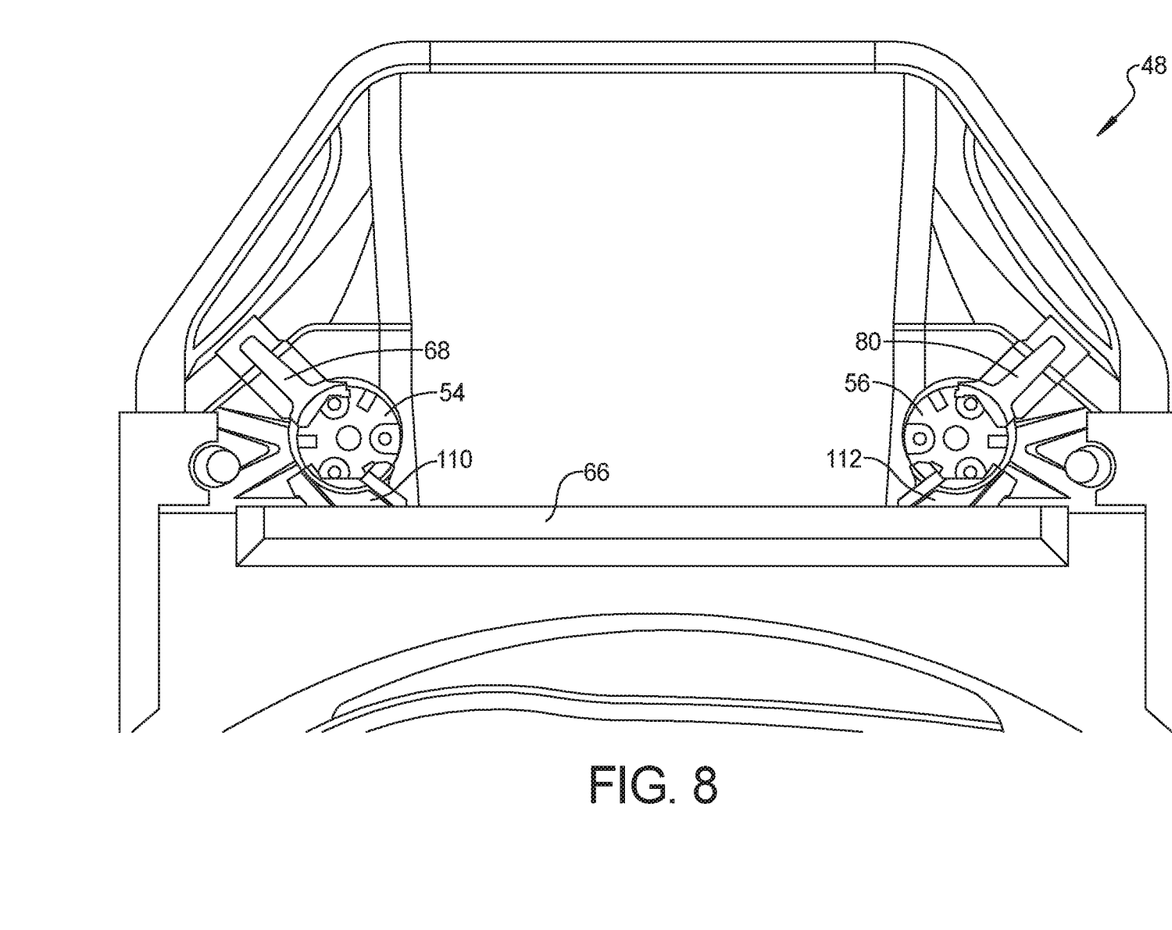
FIG. 8 is a top plan view of a forward section of a vehicle having a body structure deflector system according to another aspect.

Referring to FIG. 8 and again to FIGS. 6 and 7, the body structure deflector system 48 can also be modified to provide coupling members which are not in coaxial alignment with their respective deflectors. For example, a first coupling member 110 connected to the first shock tower 54 and the cross member 66 is not in coaxial alignment with the first deflector 68. Similarly, a second coupling member 112 connected to the second shock tower 56 and the cross member 66 is not in coaxial alignment with the second deflector 80. Because the load paths through the first and second coupling members 110, 112 to the cross member 66 are different than the load paths through the first coupling member 74 and the second coupling member 86, the first and second coupling members 110, 112 may be additionally structurally reinforced compared to the first coupling member 74 and the second coupling member 86, for example using an increased material wall thickness, a greater width, additional stiffening features, and the like.

Referring to FIG. 9 and again to FIG. 1, a graph 114 provides vehicle lateral displacements comparing a vehicle lateral displacement 116 in millimeters (mm), over a time 118 in milliseconds (ms). A lateral displacement curve 120 of a vehicle having the deflectors of the body structure deflector system 10 is compared to a lateral displacement curve 122 for a conventional vehicle lacking the deflectors of the present disclosure. It is evident for the conventional vehicle structural design lacking deflectors indicated by the lateral displacement curve 122 that vehicle lateral displacement does not exceed approximately 270 mm at 120 ms, allowing impact loading to occur in the passenger compartment 26. At a point 124 of the lateral displacement curve 120 representing the vehicle having deflectors of the present disclosure a lateral displacement of approximately 19% of a vehicle width occurs at a clearance dimension 126 as the vehicle passes the barrier 14, which is sufficient to mitigate impact loading to the passenger compartment 26.

Figure 9:
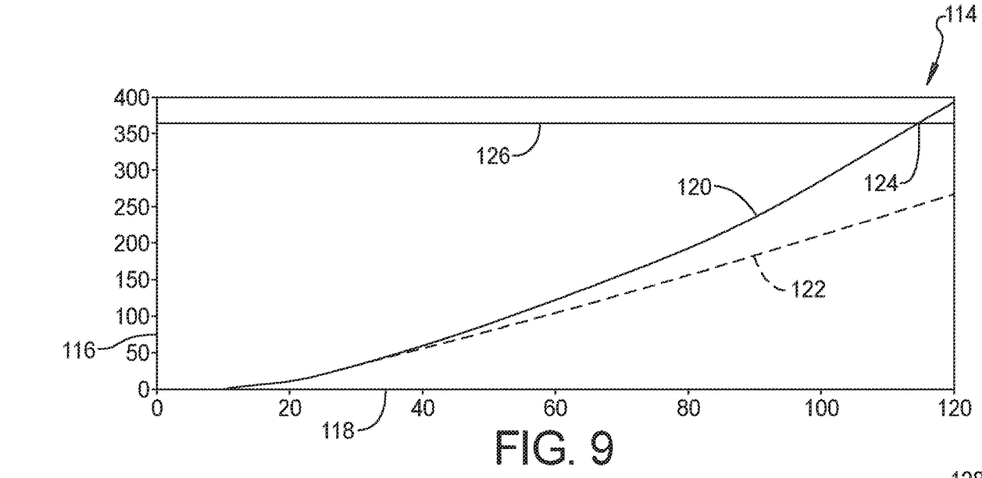
FIG. 9 is a graph depicting vehicle lateral displacement over time for a vehicle having the body structure deflector system of FIG. 1 compared to a conventional vehicle.
Figure 10:
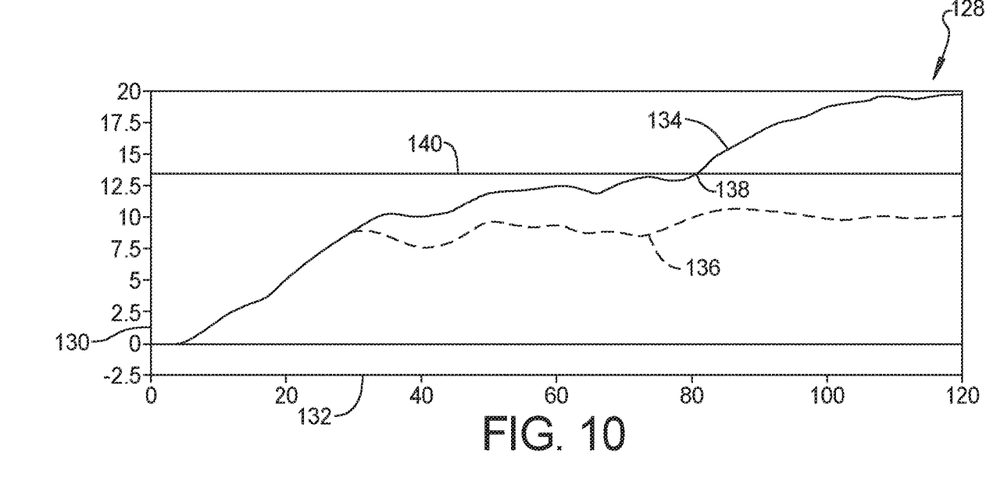
FIG. 10 is a graph depicting vehicle lateral velocity over time for a vehicle having the body structure deflector system of FIG. 1 compared to a conventional vehicle.

Referring to FIG. 10 and again to FIGS. 1 and 9, a graph 128 provides vehicle lateral velocity comparing a vehicle lateral velocity 130 in kilometers per hour, over a time 132 in milliseconds. A lateral velocity curve 134 of a vehicle having the deflectors of the body structure deflector system 10 is compared to a lateral velocity curve 136 for a conventional vehicle lacking the deflectors of the present disclosure. It is evident for the conventional vehicle structural design lacking deflectors indicated by the lateral velocity curve 136 that vehicle lateral velocity reaches a maximum of approximately 11 kph at approximately 85 ms. At a point 138 of the lateral velocity curve 134 representing the vehicle having deflectors of the present disclosure a lateral velocity reaches approximately 13.5 kph and thereafter exceeds a lateral velocity minimum 140 of 13.5 kph the vehicle passes the barrier 14, which displaces the vehicle sufficiently to mitigate impact loading to the passenger compartment 26.

A body structure deflector system of the present disclosure offers several advantages. These include development of an impact energy load-path that enables early engagement of the shock tower member and promotes shock tower inboard displacement and subsequent vehicle lateral velocity. Vehicle lateral deflection is improved during small overlap impacts resulting in reduction of the energy that needs to be managed by the structure allowing mass reduction and cost avoidance.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A vehicle body structure deflector system, comprising:
    a first shock tower and a second shock tower of a vehicle;
    a cross member positioned between the first shock tower and the second shock tower;
    a first deflector connected to the first shock tower;
    a longitudinal axis of the cross member displaced from a common central axis extending through a center of the first shock tower and a center of the second shock tower; and
    a first coupling member connected between the first shock tower and the cross member to carry an impact load received at the first deflector through the first shock tower and through the first coupling member into the cross member,
    wherein the first deflector is angularly oriented to be contacted indirectly by a barrier during forward travel of the vehicle and to transfer a portion of an energy of impact with the barrier through the first shock tower, through the cross member and into the second shock tower.

2. The vehicle body structure deflector system of claim 1, wherein the portion of the energy of impact with the barrier generates a vehicle lateral displacement.

3. The vehicle body structure deflector system of claim 2, wherein a vehicle lateral displacement is substantially parallel with a longitudinal axis of the cross member.

4. The vehicle body structure deflector system of claim 1, wherein the first deflector includes a contact face contacted by the barrier oriented substantially perpendicular to a longitudinal axis of the first deflector.

5. The vehicle body structure deflector system of claim 1, wherein the first deflector includes a contact face contacted by the barrier oriented at an angle gamma with respect to a longitudinal axis of the first deflector.

6. The vehicle body structure deflector system of claim 5, wherein the angle gamma ranges from approximately 70 degrees to approximately 120 degrees with respect to the longitudinal axis.

7. The vehicle body structure deflector system of claim 1, wherein the first deflector includes a longitudinal axis, with the longitudinal axis oriented at an angle with respect to a plane extending through a center of the first shock tower which is oriented parallel with a forward direction of travel of the vehicle.

8. The vehicle body structure deflector system of claim 1, wherein the first deflector includes a first flange used to mount and fix the first deflector at a first end to an outer wall of the first shock tower.

9. The vehicle body structure deflector system of claim 8, wherein the first deflector further includes:
    a second flange used to mount and fix the first deflector to a first structural member;
    a third flange defining a joining wall which transitions the first deflector between the first structural member and a second structural member; and
    a fourth flange used to mount and fix the first deflector to the second structural member.

10. The vehicle body structure deflector system of claim 1, wherein a centerline of the cross member is coaxially aligned with a common central axis extending through the first shock tower and the second shock tower.

11. A vehicle body structure deflector system, comprising:
    a first shock tower and a second shock tower of a vehicle;
    a cross member positioned between each of the first shock tower and the second shock tower;
    a first deflector connected to the first shock tower and a second deflector connected to the second shock tower;
    a first coupling member connected between the first shock tower and the cross member to carry an impact load received at the first deflector through the first shock tower and through the first coupling member into the cross member; and
    a second coupling member connected between the second shock tower and the cross member to carry an impact load received at the second deflector through the second shock tower and through the second coupling member into the cross member,
    wherein if one of the first deflector or the second deflector is indirectly contacted by a barrier during forward travel of the vehicle a portion of an energy of impact with the barrier is transferred through one of the first shock tower or the second shock tower, through the cross member and into the other one of the first shock tower or the second shock tower; and
    the portion of the energy of impact with the barrier generates a vehicle lateral displacement to dissipate the portion of the energy of impact.

12. The vehicle body structure deflector system of claim 11, wherein the cross member is directly connected to each of the first shock tower and the second shock tower, having a longitudinal axis of the cross member coaxially aligned with a center of each of the first shock tower and the second shock tower.

13. The vehicle body structure deflector system of claim 11, wherein the first deflector and the second deflector are angularly oriented, and the first deflector and the second deflector each includes a longitudinal axis, with the longitudinal axis oriented at an angle with respect to a plane extending through a center of one of the first shock tower or the second shock tower which is oriented parallel with a forward direction of travel of the vehicle.

14. The vehicle body structure deflector system of claim 11, wherein the first deflector and the second deflector each includes a raised central region which extends for substantially an entire length of the first deflector and the second deflector and provides longitudinal and lateral stiffening to transfer impact loads through the first deflector and the second deflector.

15. The vehicle body structure deflector system of claim 11, wherein the first deflector and the second deflector are each connected to a planar first structural member and a planar second structural member, and each includes a flange defining a joining wall which transitions in elevation between the first structural member and the second structural member.

16. A vehicle body structure deflector system, comprising:
a first shock tower and a second shock tower of a vehicle;
a cross member positioned between each of the first shock tower and the second shock tower;
a first deflector connected to the first shock tower and a second deflector connected to the second shock tower;
a longitudinal axis of the cross member is displaced from a common central axis extending through a center of the first shock tower and a center of the second shock tower; and
a first coupling member connected between the first shock tower and the cross member to carry an impact load received at the first deflector through the first shock tower and through the first coupling member into the cross member, the first coupling member in coaxial alignment with the first deflector;
wherein if one of the first deflector or the second deflector is contacted by a barrier during forward travel of the vehicle a portion of an energy of impact with the barrier is transferred through one of the first shock tower or the second shock tower, through the cross member and into the other one of the first shock tower or the second shock tower; and
the portion of the energy of impact with the barrier generates a vehicle lateral displacement equal to at least 19% of a vehicle width to dissipate the portion of the energy of impact.

17. The vehicle body structure deflector system of claim 16, further including:
a longitudinal axis of the cross member is displaced from a common central axis extending through a center of the first shock tower and a center of the second shock tower; and
a first coupling member connected between the first shock tower and the cross member to carry an impact load received at the first deflector through the first shock tower and through the first coupling member into the cross member, the first coupling member not in coaxial alignment with the first deflector.

* * * * *